(12) United States Patent
Williams (10) Patent No.: US 8,774,215 B2
(45) Date of Patent: Jul. 8, 2014

(54) FIBRE CHANNEL OVER ETHERNET

(75) Inventor: James B. Williams, Costa Mesa, CA (US)

(73) Assignee: Emulex Corporation, Costa Mesa, CA (US)

( * ) Notice: Subject to any disclaimer, the term of this patent is extended or adjusted under 35 U.S.C. 154(b) by 965 days.

(21) Appl. No.: 11/514,665

(22) Filed: Sep. 1, 2006

(65) Prior Publication Data

US 2008/0056300 A1  Mar. 6, 2008

(51) Int. Cl.
*H04L 12/50* (2006.01)
(52) U.S. Cl.
USPC ............ 370/466; 370/389; 370/474; 709/249
(58) Field of Classification Search
CPC .................................................. H04L 61/6045
See application file for complete search history.

(56) References Cited

U.S. PATENT DOCUMENTS

| 5,612,953 | A * | 3/1997 | Olnowich ...................... 370/367 |
| 6,400,730 | B1 | 6/2002 | Latif et al. |
| 7,114,009 | B2 | 9/2006 | Jones et al. |
| 2002/0034180 | A1* | 3/2002 | Kroeger et al. ............... 370/392 |
| 2003/0091037 | A1* | 5/2003 | Latif et al. .................... 370/355 |
| 2006/0098681 | A1* | 5/2006 | Cafiero et al. ................ 370/445 |
| 2006/0251067 | A1 | 11/2006 | DeSanti et al. |
| 2008/0028096 | A1* | 1/2008 | Henderson et al. ........... 709/236 |

OTHER PUBLICATIONS

R. Weber et al., "Fibre Channel (FC) Frame Encapsulation", Sun Microsystems, Dec. 2003, rfc3642.txt, Copyright (C) The Internet Society (2003), pp. 1-20.
M. Rajagopal et al., "Fibre Channel Over TCP/IP (FCIP)", Jul. 2004, rfc3821.txt, Copyright (C) The Internet Society (2004), pp. 1-74.
C. Monia et al., "iFCP—A Protocol for Internet Fibre Channel Storage Networking", Troika Networks, Adaptec (UK) Ltd., Sep. 2005, rfc4172.txt, Copyright (C) The Internet Society (2005), pp. 1-111.

* cited by examiner

*Primary Examiner* — Nicholas Sloms
(74) *Attorney, Agent, or Firm* — McAndrews, Held & Malloy Ltd.

(57) ABSTRACT

The use of Ethernet as an underlying transport for Fiber Channel (FC) frames is disclosed in the Fiber Channel Over Ethernet (FCOE) protocol. In FCOE, the FC physical layer and part of the FC-2 link layer are replaced with the Ethernet physical and link layers. Each FC frame is encapsulated within an Ethernet Frame. The payload of the FCOE frame contains type information from the FC Start Of Frame (SOF) indicator, the FC header, an optional FC payload, and type information from the FC End Of Frame (EOF) indicator. In one embodiment, an Ethernet network carrying FCOE replaces a standard FC network. In another embodiment, devices implementing FCOE may be implemented in a blade server. The entire backplane is Ethernet, over which both storage and networking traffic can be run. The Ethernet links are connected to an Ethernet switch, a FCOE/FC converter, and a FC switch.

23 Claims, 6 Drawing Sheets

FIBRE CHANNEL OVER ETHERNET

FIELD OF THE INVENTION

This invention relates to the use of the Ethernet physical and link layers to transport Fibre Channel (FC) frames, and more particularly to a novel FC Over Ethernet (FCOE) protocol for encapsulating FC frames within Ethernet frames, in one embodiment within a blade server environment.

BACKGROUND OF THE INVENTION

FC is the primary interconnect used for networked storage. Ethernet is the primary interconnect used for Local Area Networks (LANs). Both FC and Ethernet have previously been viewed as separate parallel protocols and complete solutions for different purposes. Furthermore, because Ethernet is known to be more unreliable than FC (Ethernet devices discard packets under certain conditions such as congestion), and FC provides for the reliable transport of frames, the two protocols have historically been viewed as incompatible solutions.

Figure 1:
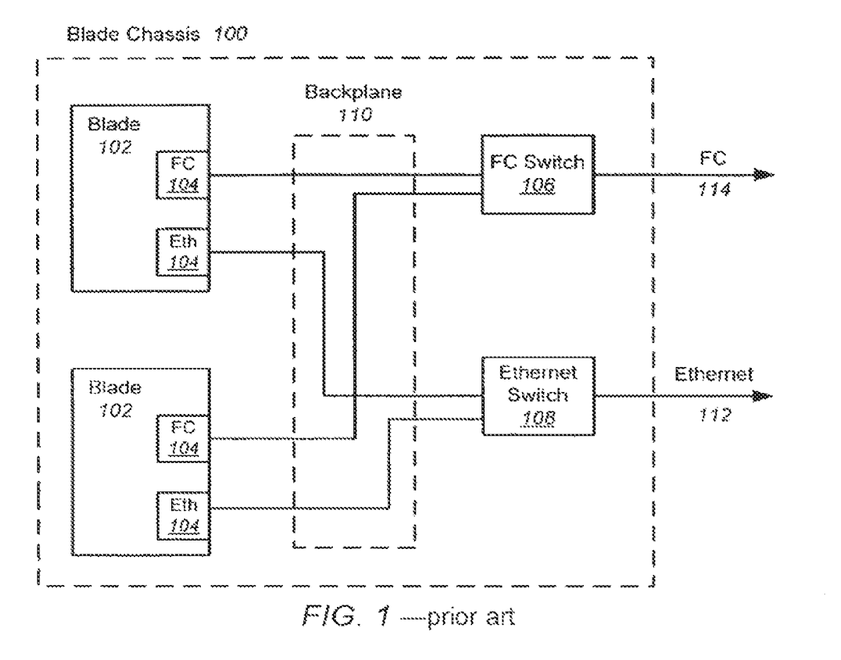
FIG. 1 illustrates an exemplary conventional blade server chassis which includes multiple blades, each blade having separate mezzanine cards for separate FC and Ethernet I/O controllers.

The historically separate and parallel nature of FC and Ethernet is illustrated in FIG. 1. FIG. 1 illustrates a conventional blade server chassis 100, which includes multiple blades 102, each blade having separate mezzanine cards 104 for separate FC and Ethernet Input/Output (I/O) controllers. The FC and Ethernet I/O controllers within each blade 102 are coupled to separate FC and Ethernet switches 106 and 108 over a backplane 110 that supports both FC and Ethernet. The Ethernet switch 108 receives data from all blades 102 and switches it to the correct destination via an external Ethernet network 112. The FC switch 106 receives storage traffic from all blades 102 and switches it to the correct destination via an external FC network 114.

More recently, however, efforts have been made to combine the FC and Ethernet protocols. For example, FC over Transmission Control Protocol/Internet Protocol (TCP/IP) (FCIP), (described in Request For Comments (RFC) 3643 and RFC3821, available at www.ietf.org), and internet FC Protocol (iFCP) (described in RFC4172), provide a method for transporting FC frames over TCP/IP/Ethernet. However, FCIP is fundamentally different from FCOE in that FCIP is a point-to-point protocol that does not route packets—all packets sent out at the transmitting end are received at the receiving end. iFCP uses TCP/IP as a transport. FCIP and iFCP also allow scaling to Wide Area Networks (WANs) and to the global Internet. However as a result of these extended capabilities, these protocols (FCIP and iFCP) are complex, expensive to implement, and have relatively low performance.

Accordingly, there is a need to layer FC over Ethernet is a manner that is less complex, more inexpensive and yet higher performing than FCIP or iFCP. In addition, it is desirable for this solution to be able to take advantage of the prevalence of legacy Ethernet switching devices and legacy FC software drivers, and allow a single physical adapter and a single wire to handle both Ethernet and storage traffic while sharing part of the switching infrastructure. There is also a need to take advantage of the wide availability of low cost Ethernet switching Application Specific Integrated Circuits (ASICs) and boxes to allow development of low cost FC switches and fabrics when FC is layered over Ethernet. Furthermore, given that 10 Gigabit (10 G) FC is not yet deployed in any significant volume, there is a need to develop FC over 10 G Ethernet (10 GbE) as a standard way of implementing FC at a 10 Gigabit data rate.

SUMMARY OF THE INVENTION

The present invention is directed to using Ethernet as an underlying transport for FC frames, in a protocol referred to herein as Fibre Channel Over Ethernet (FCOE). In FCOE, the Ethernet physical and link layers are utilized for transport of FC frames. In particular, the FC physical layer and part of the FC-2 link layer are replaced with the Ethernet physical and link layers, so that FC frames can be encapsulated and transported within Ethernet frames in a way that preserves the FC higher layers and is transparent to those layers. In FCOE, at the higher levels (e.g. the driver level, the software level, and the functional level), communications appear to be standard FC. However, at the lowest levels (e.g. the physical layer), the communications appear to be standard Ethernet, and as such, standard Ethernet switching hardware can be used.

In the FCOE protocol, each FC frame is encapsulated within an Ethernet frame. In general, the payload of the FCOE frame contains type information from the FC Start Of Frame (SOF) indicator, the FC header, an optional FC payload, an optional FC Cyclic Redundancy Check (CRC) field, type information from the FC End Of Frame (EOF) indicator, and optional padding for short packets.

The FC SOF and EOF indicators do not merely delimit the start and end of a FC frame, they also carry information. The type information represented by the FC SOF indicators and FC EOF indicators must be carried in the FCOE frame, because Ethernet SOF and EOF indicators do not contain this additional information. Therefore, in the FCOE protocol, particular numerical values are assigned to the various FC SOF and EOF indicator types, and these values are stored as FC SOF type information and FC EOF type information in the FCOE payload.

The FC header of a FC frame indicates the 24-bit destination address of the FC frame. Similarly, the Media Access Control (MAC) header of an Ethernet frame indicates the destination address of the Ethernet frame. Therefore, the FCOE protocol requires a translation from the 24-bit FC address to an Ethernet MAC address. In FCOE, the Address Resolution Protocol (ARP), which specifies how to map an address from a higher level protocol to a lower level protocol and is used frequently to map Internet Protocol (IP) addresses to MAC addresses, may be used to map the FC address to an Ethernet MAC address located within the FCOE MAC header.

The Ethernet MAC header (and therefore also the FCOE MAC header) includes a 6-byte destination address field, a 6-byte source address field, a 2-byte Ethertype field, and optionally a 4-byte Virtual Local Area Network (VLAN) field. The Ethertype field indicates the payload type. In addition, for the FCOE protocol, a new Ethertype value indicates that the Ethernet frame is a FCOE frame as opposed to a standard Ethernet frame.

In one system-level embodiment, an Ethernet network carrying FCOE replaces a standard FC network so that all participating devices are communicating using the FCOE protocol. The switches are Ethernet switches, additionally configured to provide FC fabric services. These fabric services may be provided by a FC fabric server. The functionality implemented in the FC fabric server corresponds to the FC fabric services functionality traditionally implemented in FC switches.

In another system level embodiment, devices implementing the FCOE protocol may be implemented in a blade server. The blade server includes a backplane with Ethernet (e.g. 10 GbE) pathways, and FCOE is carried on the pathways. In this blade server embodiment, FCOE represents only a short segment in the overall system. The entire backplane may be Ethernet over which both storage and networking traffic can be run. The Ethernet links are connected to an Ethernet switch, which may have a standard Ethernet port that leaves the blade server chassis and is utilized for network communications. The Ethernet switch receives data from all blades and switches it to the correct destination, either external networking via the Ethernet port, or if it is storage traffic, to a FCOE/FC converter and then out to a FC network via a FC port. The FCOE/FC converter is coupled to a FC switch, which may be located external to the blade chassis through a standard FC connection. The FC switch then routes the FC frames to FC devices over a FC fabric. The FC switch may be additionally configured to provide FC fabric services.

In the two embodiments described above, any of the devices implementing the FCOE protocol may utilize FCOE-specific hardware, or a processor and firmware capable of implementing the FCOE protocol. One device capable of implementing the FCOE protocol is the Intelligent Network Processor (INP) described in U.S. application Ser. No. 11/433,728 filed on May 11, 2006 and entitled "Intelligent Network Processor and Method of Using Intelligent Network Processor," the contents of which are incorporated by reference herein. One or more processors and firmware within the INP may be programmed to implement the FCOE protocol in the devices described above.

In particular, in a FCOE blade server utilizing INPs, the blade server chassis includes a plurality of blades, each blade containing an INP for implementing an FCOE I/O controller function. The blades are connected to two I/O modules across a redundant Ethernet backplane (e.g. 10 GbE), each I/O module being a card within the blade server chassis and containing an INP for implementing the Ethernet switch function, the FCOE/FC converter function, and the FC switch function. The Ethernet backplane provides a unified backplane transport for both LAN and SAN applications.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Embodiments of the present invention are directed to using Ethernet as an underlying transport for FC frames, in a novel protocol referred to herein as Fibre Channel Over Ethernet (FCOE).

Figure 2:
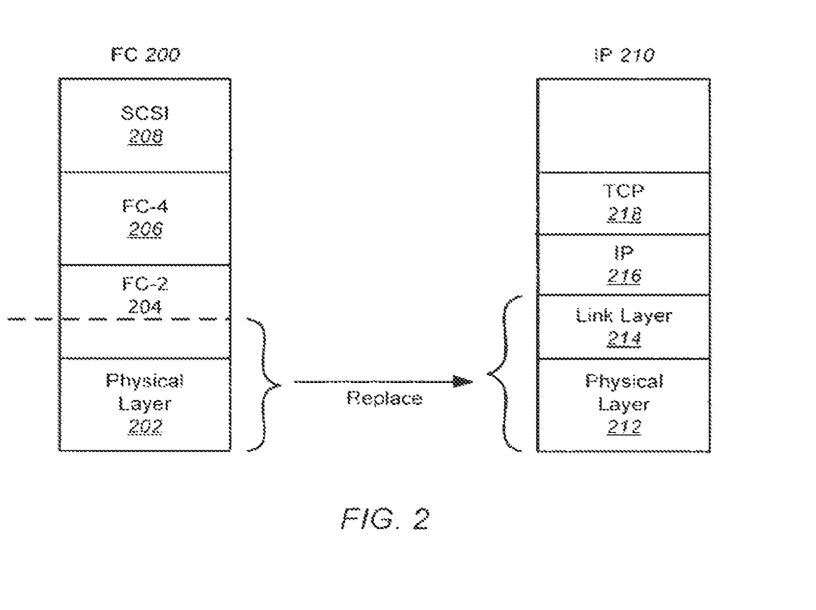
FIG. 2 is an illustration of the FC protocol stack and the IP protocol stack and how the lower FC layers are replaced by the lower Ethernet layers according to the FCOE protocol of embodiments of the present invention.

The FC protocol is a layered protocol, typically used as a Small Computer System Interface (SCSI) transport. As illustrated in FIG. 2, the FC protocol stack 200 is comprised of layers, including, from the bottom up, FC-1 or the physical layer 202 which includes optical connectors, the timing of signaling, etc., the FC-2 or link layer 204, which includes link level services such as flow control and framing, the FC-4 layer 206 which includes higher level protocol constructs, and the SCSI layer 208. In the IP protocol stack 210, the layers include, from the bottom up, the Ethernet physical layer 212, the Ethernet link layer 214, the IP layer 216, and the TCP layer 218.

Embodiments of the present invention utilize the Ethernet physical and link layers for transport of FC frames. As shown in FIG. 2, the FC physical layer 202 and part of the FC-2 link layer 204 are replaced with the Ethernet physical and link layers 212 and 214, so that FC frames can be encapsulated and transported within Ethernet frames in a way that preserves the FC higher layers and is transparent to those layers. In FCOE, at the higher levels (e.g. the driver level, the software level, and the functional level), communications appear to be standard FC. However, at the lowest levels (e.g. the physical layer), the communications appear to be standard Ethernet, and as such, standard Ethernet switching hardware can be used.

One advantage of using FCOE according to embodiments of the present invention is the ability to leverage the Ethernet physical layer and make use of existing Ethernet infrastructure such as Ethernet switch ASICs and optics instead of FC, which due to the volumes associated with Ethernet, can be much less expensive. Another advantage of the present invention is that with FCOE, networking and storage traffic can be implemented over a single Ethernet link. There is no need to have separate FC and network connectivity because FCOE uses standard Ethernet switching.

Figure 3:
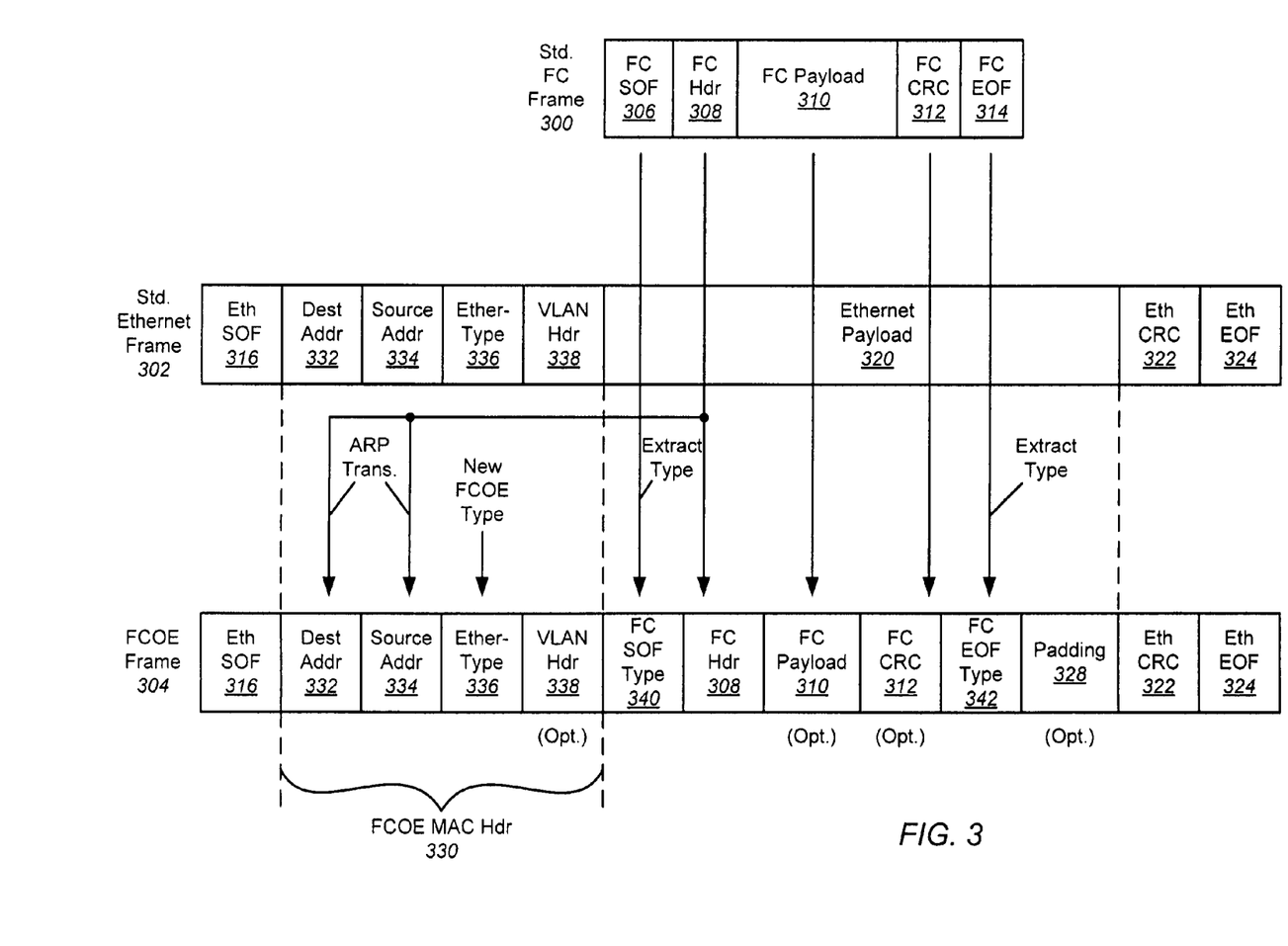
FIG. 3 illustrates the encapsulating of a FC frame into an Ethernet frame to form an FCOE frame according to embodiments of the present invention.

FIG. 3 illustrates the encapsulating of a FC frame 300 into an Ethernet frame 302 to form an FCOE frame 304 and data structure according to embodiments of the present invention. In FIG. 3, a standard FC frame 300 includes a Start of Frame (SOF) indicator 306, a FC header 308, a FC payload 310, a FC Cyclic Redundancy Check (CRC) field 312, and a FC End of Frame (EOF) indicator 314. A standard Ethernet frame 302 includes an Ethernet SOF indicator 316, an Ethernet Media Access Control (MAC) header 318, a Ethernet payload 320, an Ethernet CRC field 322 and an Ethernet EOF indicator 324.

In the FCOE protocol according to embodiments of the present invention, each FC frame is encapsulated within an Ethernet Frame. In general, the payload 326 of the FCOE frame 304 contains type information 340 from the FC SOF indicator 306, the FC header 308, an optional FC payload 310, an optional FC CRC field 312, type information 342 from the FC EOF indicator 314, and optional padding 328 for short packets.

The FC SOF and EOF indicators 306 and 314 do not merely delimit the start and end of a FC frame, they also carry information. There are a number of different types of FC SOF indicators 306 and FC EOF indicators 314, each indicator type representing certain information. For example, FC frames are grouped into sequences, so some of the FC SOF indicator types indicate whether the FC frame is the start of a new sequence or part of an existing sequence. The class of the transaction is also represented by a particular FC SOF indicator type. Similarly, an example of a particular FC EOF indicator type is an abort EOF, which indicates that an error occurred within the frame.

The various FC SOF indicator types and FC EOF indicator types and the information represented by each are described in RFC 3643, for example, the contents of which are incorporated by reference herein. SOF types include SOFf, SOFi2, SOFn2, SOFi3, SOFn3, SOFi4, SOFn4, and SOFc4 (active Class-4), where the "i" and "n" designation refer to the first frame of a sequence and subsequent frames in a sequence, respectively, and {2, 3, 4, f} refer to the FC Class of service. EOF types include EOFn (normal—not the last frame of sequence), EOFt (terminate—the last frame of a sequence), EOFni (normal invalid—FC routing error detected), EOFa (abort—sender aborted, receiver should discard), EOFdt (disconnect terminate—Used for Class-4 to disconnect), EOFdti (disconnect terminate invalid—Class-4), EOFrt (remove terminate—removes Class-4 circuit), and EORrti (remove terminate invalid—Class-4).

In embodiments of the present invention, the type information represented by the FC SOF indicators 306 and FC EOF indicators 314 must be carried in the FCOE frame, because Ethernet SOF and EOF indicators 316 and 324 do not contain this additional information. Therefore, in the FCOE protocol according to embodiments of the present invention, particular numerical values are assigned to the various FC SOF and EOF indicator types, and these values are stored as FC SOF type information 340 and FC EOF type information 342 in the FCOE payload 326.

The FC header 308 of a FC frame 300 indicates a 24-bit destination address and a 24-bit source address of the FC frame. Similarly, the MAC header 318 of an Ethernet frame 302 indicates the destination address and source address of the Ethernet frame. Note that each FC port will ship with a factory configured MAC address as well as its FC world wide name. Therefore, the FCOE protocol requires a translation from the 24-bit FC destination address to an Ethernet MAC destination address, and a translation from the 24-bit FC source address to an Ethernet MAC source address. According to embodiments of the present invention, the Address Resolution Protocol (ARP), which specifies how to map an address from a higher level protocol to a lower level protocol and is used frequently to map IP addresses to MAC addresses, may be used to map the FC destination address to an Ethernet MAC destination address 332 located within the FCOE MAC header 330, and map the FC source address to an Ethernet MAC source address 334 located within the FCOE MAC header 330. However, it should be understood that the ARP protocol is just one example protocol, and that other protocols may be used to map an FC address to a MAC address. The ARP protocol is defined in RFC826, available at www.ietf.org and incorporated herein by reference. It should be understood that FC discovery will remain unchanged as ARP is layered below FC and works transparently.

Note that using the ARP protocol to map the FC destination address to an Ethernet MAC destination address is advantageous over other methods such as a hardware-derived address, because such methods are not compatible with FC login processes as specified in the Ethernet Standard IEEE 802.3, the contents of which are incorporated by reference herein. For example, U.S. Patent Application Publication 2006/0098681A1 describes a hardware-derived address in which a 48-bit Ethernet destination MAC address is comprised of the 24-bit destination FC identification field and a 24-bit Organization Unique Identifier (OUI) code that has been registered to indicate the FCOE protocol, and a 48-bit Ethernet source MAC address is similarly comprised of the 24-bit source FC identification (ID) field and the 24-bit OUI code that has been registered to indicate the FCOE protocol. However, such a methodology is not compatible with the FC fabric login process, where a zero is initially stored as the source FC ID of a device and a subsequent response from a switch connected over the FC fabric is required to provide the actual source FC ID for the device. This FC fabric login process cannot be performed using FCOE. Embodiments of the present invention avoid this problem and are compatible with IEEE 802.3 because the Ethernet MAC address is physically assigned in the normal way, so upon power up an Ethernet MAC address is available to be mapped to a FC ID.

The Ethernet MAC header 318 (and therefore also the FCOE MAC header 330) includes the 6-byte destination address field 332, the 6-byte source address field 334, a 2-byte Ethertype field 336, and optionally a 4-byte VLAN field 338. The Ethertype field 336 indicates the payload type. In addition, for the FCOE protocol, a new Ethertype value is provided to indicate that the Ethernet frame is a FCOE frame 304 as opposed to a standard Ethernet frame. In addition to the new FCOE Ethertype according to embodiments of the present invention, other conventional Ethertypes include, but are not limited to, the standard Ethernet Ethertype, an ARP Ethertype, and a pause frame Ethertype. However, if all destinations in the system are FCOE in an end-to-end FCOE system embodiment (described in further detail below), a new FCOE Ethertype field may not be needed.

Although the FC CRC field 312 does not need to be captured in the FCOE payload 326 because Ethernet already has a CRC field 322, nevertheless in alternative embodiments of the present invention the FC CRC field 312 may be included in the FCOE payload to assist in identifying errors in the translation between FC and FCOE in certain system embodiments. For example, including the FC CRC field 312 may be helpful in a situation where a FC initiator generates a FC frame and an original FC CRC, the FC frame is translated from FC to FCOE in a converter and subsequently translated back from FCOE to a FC frame in another converter, and then the FC frame is received by a FC target. When the FC frame is received by the FC target, a new FC CRC is generated and checked against the original FC CRC. If, during the translations between FCOE and FC, an error was generated, the new and original CRCs will not match, indicating the presence of an error.

Conventional FC uses a credit-based flow control mechanism for link level flow control. With link level flow control, FC primitive sequences grant credits to remote FC devices to send FC frames. The remote FC devices will consume credits as FC frames are sent. The use of credits avoids the dropping of frames under congestion.

In contrast, Ethernet conventionally does not provide for flow control, so that if an Ethernet frame is sent and the remote end does not have room for it, the frame is dropped. It is the responsibility of a higher level protocol to retransmit the Ethernet frame at a later time. However, there is an option defined in the Ethernet IEEE 802.3x standard, incorporated herein by reference, that does provide for flow control based on the concept of pause frames. The use of pause frames allows for the implementation of an on/off type flow control, wherein the transmitting device will stop sending Ethernet frames when it receives an indication that the remote device's queues are full. Credit based flow control is theoretically superior to on/off flow control in that it requires buffering equal to link bandwidth times round trip time, allowing full utilization of the link. On/off flow control requires three to five times this much buffering to achieve full link performance with no packet drops and some safety margin. In practice, however, this is not a problem. With practical Ethernet implementations, the amount of buffering required is still small enough to be easily integrated into the Ethernet interface with low hardware cost.

Therefore, in embodiments of the present invention, Ethernet pause frames are used for flow control. The use of Ethernet pause frames is advantageous because standard Ethernet switches understand the concept of pause frames, allowing the present invention to be as compatible with existing standard Ethernet infrastructure as possible. However, it should be understood that other methods of flow control such as credit-based flow control, a method of flow control well-understood by those skilled in the art, could be utilized instead of Ethernet pause frames.

Figure 4:
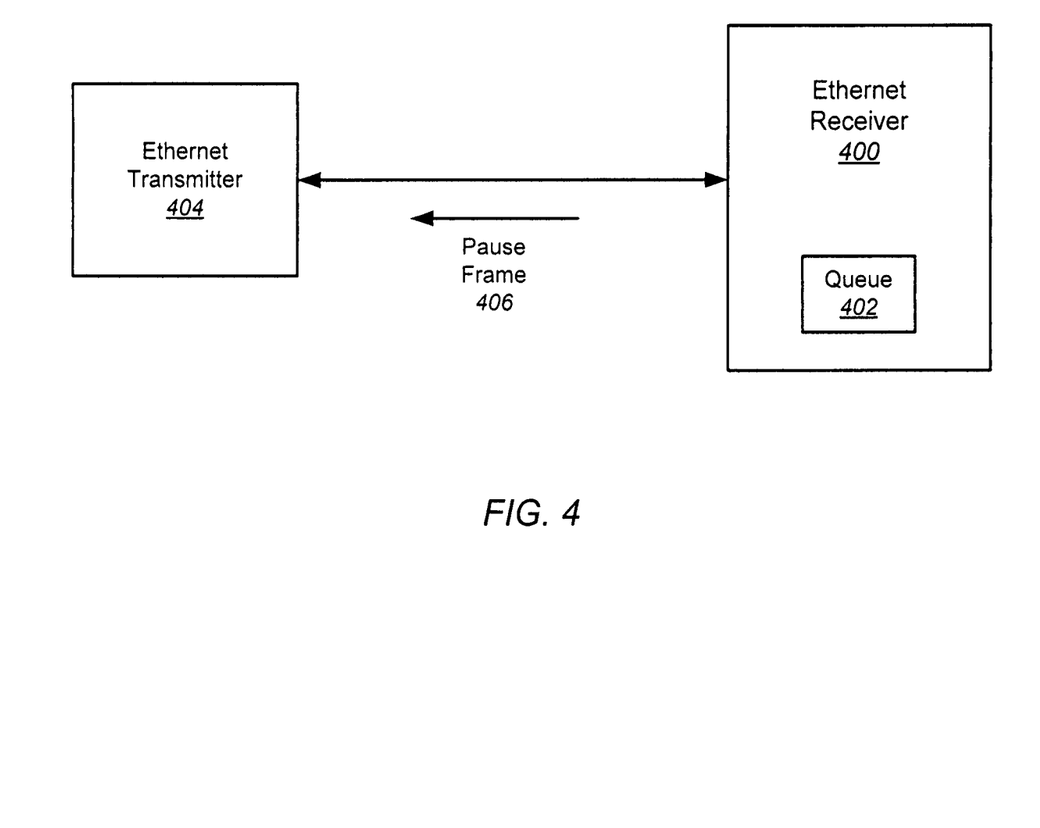
FIG. 4 is a simplified illustration of an Ethernet receiver including a destination queue for storing frames received from an Ethernet transmitter that are to be processed, and the use of pause frames for flow control according to embodiments of the present invention.

FIG. 4 is a simplified illustration of an Ethernet receiver 400 including a destination queue 402 for storing Ethernet frames received from an Ethernet transmitter 404 that are to be processed, and the use of pause frames for flow control according to embodiments of the present invention. An Ethernet pause frame 406 (e.g. Pause 1) is generated at the Ethernet receiver 400 and send back to the Ethernet transmitter 404 when the destination queue 402 reaches a certain threshold (e.g. ⅔ full). The pause frame 406 contains a value that indicates how long the Ethernet transmitter 404 is to pause before sending Ethernet frames again. When the destination queue 402 empties to a certain threshold (e.g. ⅓ full), another Ethernet pause frame 406 (e.g. Pause 0) is sent back to the Ethernet transmitter 404 to instruct it to resume sending frames.

Standard Ethernet frames currently have a 1500 byte payload. However, full size FC payloads are currently 2112 bytes long. If a FC frame is embedded inside a standard Ethernet frame, only a maximum of 1476 bytes would be available for the FC payload. Therefore, in embodiments of the present invention, FC frames can be restricted to the 1476 byte payload, or alternatively a full size 2112 byte FC payload can be embedded into an oversize Ethernet frame (a "jumbo frame," according to Ethernet terminology). Jumbo frames allow FC frames to remain the same size, so they are easier to use in FCOE implementations. However, reducing the size of FC frames to 1476 bytes is not visible to higher layers, because a FC payload is typically divided into sequences, and the sequences would simply have more frames in them.

In one system-level embodiment of the present invention, an Ethernet network carrying FCOE replaces a standard FC network so that all participating devices are communicating using the FCOE protocol. The switches are Ethernet switches, additionally configured to provide FC fabric services. These fabric services may be provided by a FC fabric server. It is well-understood to those skilled in the art that some FC frames will contain a reserved address for frames requiring special handling. These addresses include 0xfffffe, 0xfffffd, and 0xfffffc. In embodiments of the present invention, a FC fabric server is implemented that claims these addresses and processes the associated frames. Other fabric services include initialization sequences with login packets and State Change Notifications (SCNs). The functionality implemented in the FC fabric server corresponds to the FC fabric services functionality traditionally implemented in FC switches.

Figure 5:
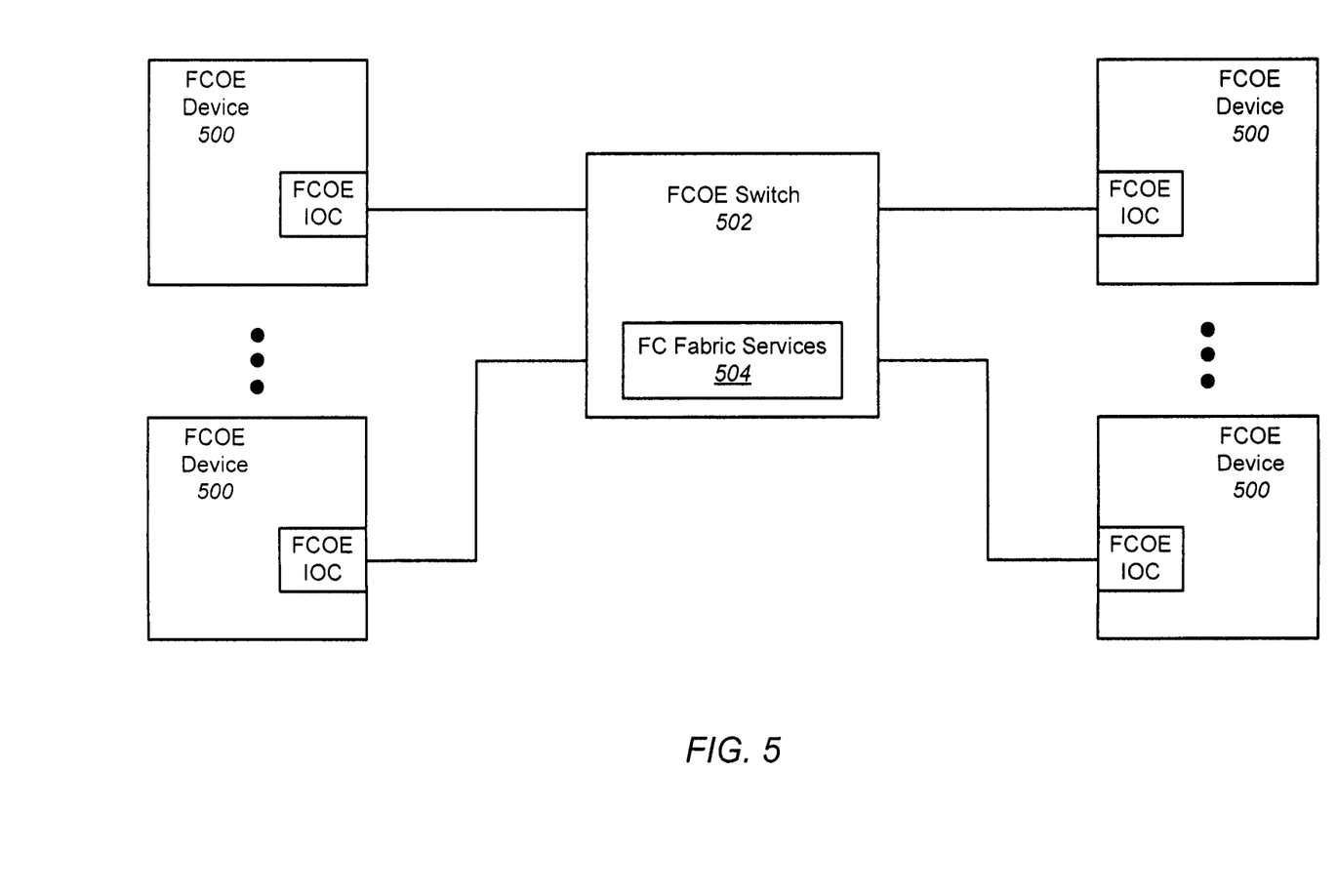
FIG. 5 is an illustration of an exemplary system in which FCOE is utilized end-to-end according to embodiments of the present invention.

FIG. 5 illustrates one embodiment of the present invention in which FCOE is utilized end-to-end. In FIG. 5, a plurality of devices 500 implementing the FCOE protocol are coupled together using a FCOE switch 502, which also implements required FC fabric services 504. In terms of packet switching, the FCOE switch 502 appears to be an Ethernet switch, with the addition of FC fabric services 504.

In another system level embodiment of the present invention, devices implementing the FCOE protocol may be implemented in a blade server. The blade server would include a backplane with Ethernet (e.g. 10 Gigabit Ethernet (10 GbE)) pathways, and FCOE would be carried on the pathways. In this blade server embodiment, FCOE would represent only a short segment in the overall system.

Figure 6:
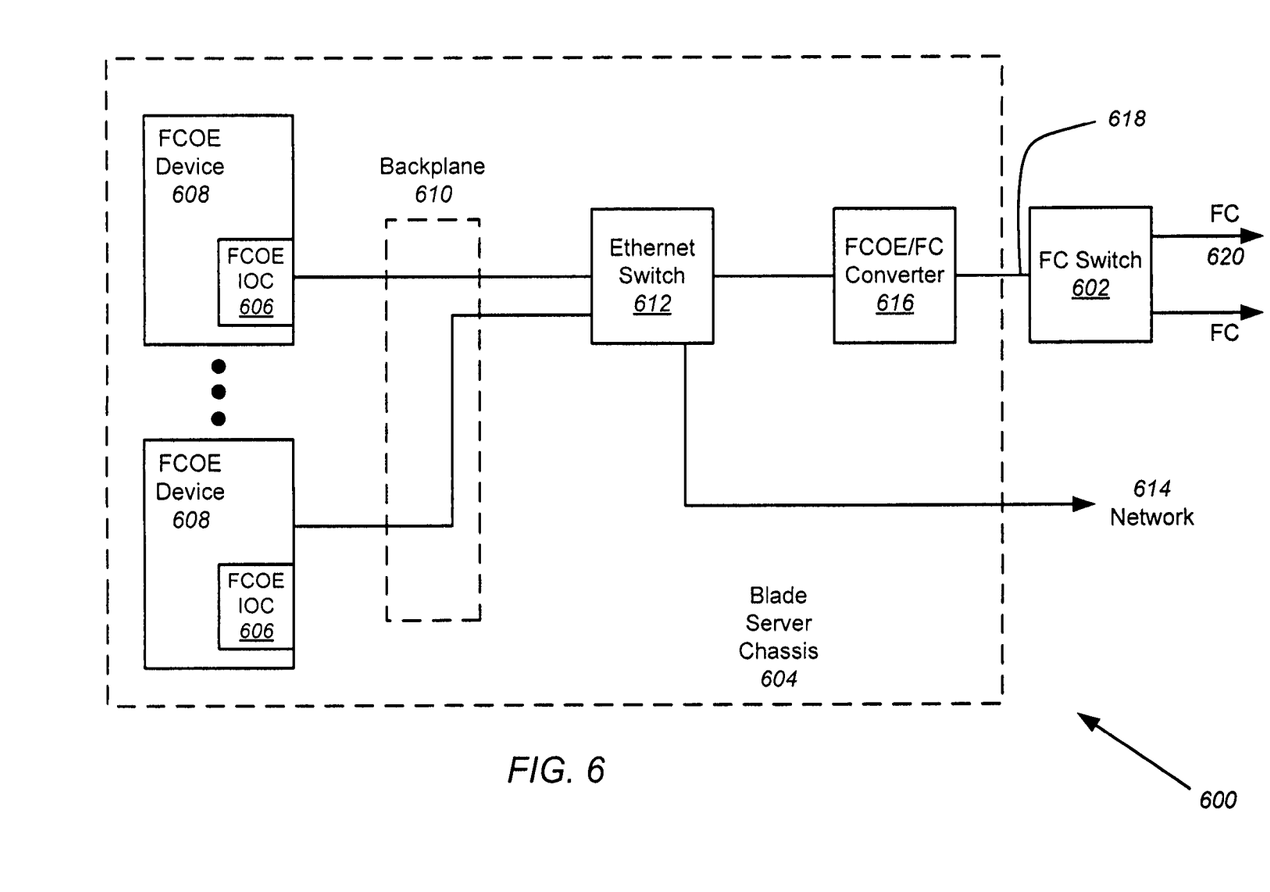
FIG. 6 illustrates an exemplary blade server with blades implementing FCOE connected to an Ethernet switch and a FCOE/FC converter according to embodiments of the present invention.

FIG. 6 illustrates a blade server embodiment of the present invention 600 in which the FCOE switch is eliminated in favor of a standard external FC switch 602. This embodiment does not rely on targets understanding the FCOE protocol. Within a blade server chassis 604, I/O controllers 606 on the blades 608 contain firmware executable by a processor to implement the FCOE protocol described above, and generate/receive FCOE signaling and standard Ethernet networking functionality over an Ethernet link. The entire backplane 610 could be Ethernet over which both storage and networking traffic can be run. The Ethernet links are connected to an Ethernet switch 612, which may have a standard Ethernet port 614 that leaves the blade server chassis and is utilized for network communications. The Ethernet switch 612 receives data from all blades 608 and switches it to the correct destination, either external networking via the Ethernet port 614, or if it is storage traffic, to a FCOE/FC converter 616 and then out to a FC network via a FC port 618. The Ethernet switch 612 is capable of simultaneously routing both FCOE and standard Ethernet traffic. The FCOE/FC converter is coupled to the FC switch 602, which may be located within the blade server chassis 604 or external to the blade server chassis through a standard FC connection. The FC switch 602 then switches the FC frames to FC devices over a FC fabric 620. The FC switch 602 may be additionally configured to provide FC fabric services.

The Ethernet switch 612 may be another card located in the back panel of the blade server chassis 604. Alternatively, the Ethernet switch 612 may be just an ASIC on another card in the blade server chassis 604. The FCOE/FC converter 616 may also be implemented by an ASIC on the same card as the Ethernet switch 612.

Therefore, in the embodiment of FIG. 6, part of the network is running FCOE, and the other part is running standard FC, with a FCOE/FC converter 616 in the middle. The FCOE/FC converter 616 extracts encapsulated FC frames from FCOE packets and runs the FC frames over FC. In contrast to the conventional system of FIG. 1, the blade server 604 of FIG. 6 requires only an Ethernet backplane 610 and only one I/O controller 606 per blade 608 to support the new FCOE protocol and handle both network and storage traffic, and only one Ethernet switch 612 and FCOE/FC converter 616 per blade.

It should be understood that embodiments of the present invention are based on the Ethernet protocol, not the IP protocol. Because FCOE cannot be routed based on IP addresses, only Ethernet MAC addresses, FCOE may be most advantageous on LANs. This is in contrast to iSCSI or FCIP which can be routed over the Internet. The advantage of the FCOE protocol according to embodiments of the present invention is that it is faster, simpler and easier to implement with relatively low cost Ethernet hardware. FCOE is also simpler because it doesn't implement the TCP/IP protocol, which is more complex.

In the embodiments of FIGS. 5 and 6, the devices 500 and blades 608 may implement the FCOE protocol using FCOE-specific hardware, or one or more processors, firmware and hardware capable of implementing the FCOE protocol and performing Host Bus Adapter (HBA) or I/O controller capabilities. Additionally, in the embodiment of FIG. 6, the Ethernet switch 612, FCOE/FC converter 616 and FC switch 602 may be implemented using one or more processors, firmware, switch logic and hardware capable of implementing the FCOE protocol and performing router and switch capabilities on FC and Ethernet networks. One device capable of implementing the FCOE protocol and performing all of the above-mentioned functions is the Intelligent Network Processor (INP) described in U.S. application Ser. No. 11/433,728 filed on May 11, 2006 and entitled "Intelligent Network Processor and Method of Using Intelligent Network Processor," the contents of which are incorporated by reference herein. One or more processors and firmware within the INP may be programmed to implement the FCOE protocol described above.

Figure 7:
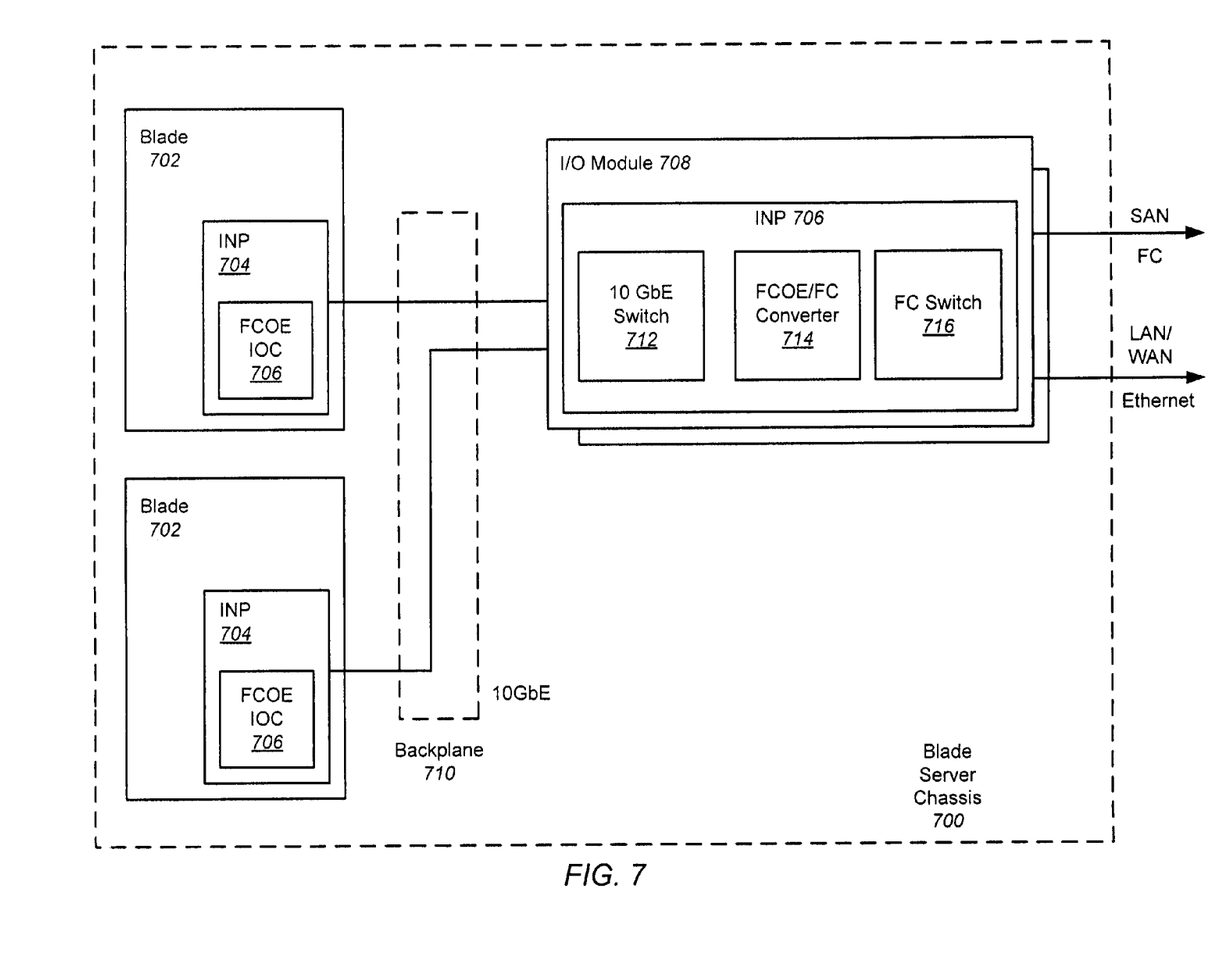
FIG. 7 illustrates an exemplary FCOE blade server utilizing INPs according to embodiments of the present invention.

FIG. 7 illustrates the FCOE blade server embodiment of FIG. 6, but utilizing INPs according to embodiments of the present invention. In FIG. 7, the blade server chassis 700 includes a plurality of blades 702, each blade containing an INP 704 for implementing an FCOE I/O controller function 706 as described above. The blades 702 are connected to two I/O modules 708 across a redundant Ethernet backplane 710 (e.g. 10 GbE), each I/O module 708 being a card within the blade server chassis 700 and containing an INP 706 for implementing the Ethernet switch function 712, the FCOE/FC converter function 714, and the FC switch function 716. The Ethernet backplane 710 provides a unified backplane transport for both LAN and SAN applications.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A non-transitory computer-readable storage medium having stored thereon a Fibre Channel Over Ethernet (FCOE) frame data structure for encapsulating a Fibre Channel (FC) frame within an Ethernet frame, the FCOE frame data structure comprising:
   an Ethernet frame data structure comprising:
   a FCOE Start Of Frame (SOF) indicator according to a FC SOF indicator in the FC frame;
   a FCOE End Of Frame (EOF) indicator according to a EOF indicator in the FC frame;
   an Ethernet payload within the Ethernet frame data structure, the Ethernet payload containing type information extracted from a FC Start Of Frame (SOF) indicator, a FC header, and type information extracted from a FC End Of Frame (EOF) indicator, wherein the FC SOF and EOF indicators are of different types, each type represented by the type information extracted from the FC SOF and EOF indicators; and
   an Ethernet Media Access Control (MAC) header within the Ethernet frame data structure, the Ethernet MAC header comprising:
   an Ethernet MAC destination address translated from a FC destination address using an Address Resolution Protocol (ARP),
   an Ethernet MAC source address translated from a FC source address using the ARP, and
   an Ethertype value indicating that the Ethernet frame is a FCOE frame.

2. The non-transitory computer-readable medium as recited in claim 1, the FCOE frame data structure further comprising a FC Cyclic Redundancy Check (CRC) field contained within the Ethernet payload.

3. The non-transitory computer-readable storage medium as recited in claim 1, the FCOE frame data structure further comprising a 2112 byte FC payload contained within the Ethernet payload to form a jumbo FCOE frame data structure.

4. The non-transitory computer-readable storage medium as recited in claim 1, the computer-readable medium contained within an Ethernet network, the Ethernet network comprising:
   a plurality of FCOE devices, each FCOE device including the computer-readable medium for implementing a FCOE protocol utilizing the FCOE frame data structure; and
   a FCOE switch coupled to each of the plurality of FCOE devices, the FCOE switch for switching FCOE frames formatted according to the FCOE frame data structure between the plurality of FCOE devices, and for performing FC fabric services.

5. The non-transitory computer-readable storage medium as recited in claim 4, wherein each of the plurality of FCOE devices and the FCOE switch are compatible with IEEE 802.3.

6. The non-transitory computer-readable storage medium as recited in claim 1, the computer-readable storage medium contained within a blade server, the blade server comprising:
   a plurality of FCOE devices, each FCOE device including the computer-readable storage medium for implementing a FCOE protocol utilizing the FCOE frame data structure;
   a FCOE to FC converter for converting between FCOE frames formatted according to the FCOE frame data structures and FC frames;
   an Ethernet switch coupled to each of the plurality of FCOE devices over an Ethernet backplane and coupled to the FCOE to FC converter, the Ethernet switch for switching FCOE frames between the plurality of FCOE devices and the FCOE to FC converter; and
   a FC switch coupled to the FCOE to FC converter for switching FCOE frames to FC devices over a FC fabric, and for performing FC fabric services.

7. The non-transitory computer-readable storage medium as recited in claim 6, wherein each of the plurality of FCOE devices and the FCOE to FC converter are compatible with IEEE 802.3.

8. The non-transitory computer-readable storage medium as recited in claim 6,
   wherein each of the plurality of FCOE devices includes one or more processors and firmware for implementing the FCOE protocol; and
   wherein the Ethernet switch, the FCOE to FC converter, and the FC switch are implemented by one or more processors, firmware, switch logic and hardware for performing router and switch functions on FC and Ethernet networks.

9. A method of encapsulating a Fibre Channel (FC) frame within an Ethernet frame to generate a Fibre Channel Over Ethernet (FCOE) frame, the method comprising:

encapsulating a FC payload of the FC frame and information extracted from a FC Start Of Frame (SOF) indicator, a FC header, and type information extracted from a FC End Of Frame (EOF) indicator within an Ethernet payload of the Ethernet frame, wherein the FC SOF and EOF indicators are of different types, each type represented by the type information extracted from the FC SOF and EOF indicators;

adding a FCOE Start Of Frame (SOF) indicator according to a FC SOF indicator in the FC frame;

adding a FCOE End Of Frame (EOF) indicator according to a EOF indicator in the FC frame;

translating a FC destination address to an Ethernet Media Access Control (MAC) destination address using an Address Resolution Protocol (ARP);

translating a FC source address to an Ethernet MAC source address using the ARP; defining an Ethertype value indicating that the Ethernet frame is a FCOE frame; and storing the Ethernet MAC destination address, the Ethernet MAC source address, and the Ethertype value into an Ethernet MAC header within the Ethernet frame.

10. The method as recited in claim 9, further comprising encapsulating a FC Cyclic Redundancy Check (CRC) field within the Ethernet payload.

11. The method as recited in claim 9, further comprising encapsulating a 1476 byte FC payload within the Ethernet payload.

12. The method as recited in claim 9, further comprising encapsulating a 2112 byte FC payload within the Ethernet payload to form a jumbo FCOE frame data structure.

13. A Fibre Channel Over Ethernet (FCOE) blade server, the FCOE blade server comprising:
a plurality of FCOE devices, each FCOE device for implementing a FCOE protocol utilizing FCOE frames;
a FCOE to Fibre Channel (FC) converter for converting between FCOE frames and FC frames;
an Ethernet switch coupled to each of the plurality of FCOE devices over an Ethernet backplane and coupled to the FCOE to FC converter, the Ethernet switch for switching FCOE frames between the plurality of FCOE devices and the FCOE to FC converter; and
a FC switch coupled to the FCOE to FC converter for switching FCOE frames to FC devices over a FC fabric, and for performing FC fabric services;
wherein each of the FCOE frames comprises:
a FCOE Start Of Frame (SOF) indicator according to a FC SOF indicator in the FC frame;
a FCOE End Of Frame (EOF) indicator according to a EOF indicator in the FC frame;
an Ethernet payload within the Ethernet frame data structure, the Ethernet payload containing type information extracted from a FC Start Of Frame (SOF) indicator, a FC header, and type information extracted from a FC End Of Frame (EOF) indicator, wherein the FC SOF and EOF indicators are of different types, each type represented by the type information extracted from the FC SOF and EOF indicators; and
an Ethernet Media Access Control (MAC) header within the Ethernet frame data structure, the Ethernet MAC header comprising:
an Ethernet MAC destination address translated from a FC destination address using an Address Resolution Protocol (ARP),
an Ethernet MAC source address translated from a FC source address using the ARP, and an Ethertype value indicating that the Ethernet frame is a FCOE frame.

14. The FCOE blade server as recited in claim 13, the Ethernet MAC header within the FCOE frame further comprising a FC Cyclic Redundancy Check (CRC) field.

15. The FCOE blade server as recited in claim 13, the Ethernet payload within the FCOE frame further comprising a 1476 byte FC payload.

16. The FCOE blade server as recited in claim 13, the Ethernet payload within the FCOE frame further comprising a 2112 byte FC payload contained within the Ethernet payload to form a jumbo FCOE frame.

17. The FCOE blade as recited in claim 13, wherein each of the plurality of FCOE devices and the FCOE to FC converter are compatible with IEEE 802.3.

18. A Fibre Channel Over Ethernet (FCOE) network, the FCOE network comprising:
a plurality of FCOE devices, each FCOE device for implementing a FCOE protocol utilizing FCOE frames; and
a FCOE switch coupled to each of the plurality of FCOE devices, the FCOE switch for switching FCOE frames between the plurality of FCOE devices, and for performing FC fabric services;
wherein each of the FCOE frames comprises:
a FCOE Start Of Frame (SOF) indicator according to a FC SOF indicator in the FC frame;
a FCOE End Of Frame (EOF) indicator according to a EOF indicator in the FC frame;
an Ethernet payload within the Ethernet frame data structure, the Ethernet payload containing type information extracted from a FC Start Of Frame (SOF) indicator, a FC header, and type information extracted from a FC End Of Frame (EOF) indicator, wherein the FC SOF and EOF indicators are of different types, each type represented by the type information extracted from the FC SOF and EOF indicators; and
an Ethernet Media Access Control (MAC) header within the Ethernet frame data structure, the Ethernet MAC header containing comprising:
an Ethernet MAC destination address translated from a FC destination address using an Address Resolution Protocol (ARP),
an Ethernet MAC source address translated from a FC source address using the ARP, and an Ethertype value indicating that the Ethernet frame is a FCOE frame.

19. The FCOE network as recited in claim 18, the Ethernet payload within the FCOE frame further comprising a FC Cyclic Redundancy Check (CRC) field.

20. The FCOE network as recited in claim 18, the Ethernet payload within the FCOE frame further comprising a 1476 byte FC payload.

21. The FCOE network as recited in claim 18, the Ethernet payload within the FCOE frame further comprising a 2112 byte FC payload contained within the Ethernet payload to form a jumbo FCOE frame.

22. The FCOE network as recited in claim 18, wherein each of the plurality of FCOE devices and the FCOE switch are compatible with IEEE 802.3.

23. The computer-readable storage medium as recited in claim 1, the FCOE frame data structure further comprising a 1476 byte FC payload contained within the Ethernet payload.

* * * * *